US011455985B2

(12) United States Patent
Kariya et al.

(10) Patent No.: US 11,455,985 B2
(45) Date of Patent: Sep. 27, 2022

(54) INFORMATION PROCESSING APPARATUS

(71) Applicant: SONY INTERACTIVE ENTERTAINMENT INC., Tokyo (JP)

(72) Inventors: Shinichi Kariya, Chiba (JP); Shinichi Honda, Saitama (JP); Hiroyuki Segawa, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 13 days.

(21) Appl. No.: 16/092,642

(22) PCT Filed: Feb. 9, 2017

(86) PCT No.: PCT/JP2017/004761
§ 371 (c)(1),
(2) Date: Oct. 10, 2018

(87) PCT Pub. No.: WO2017/187712
PCT Pub. Date: Nov. 2, 2017

(65) Prior Publication Data
US 2019/0130910 A1 May 2, 2019

(30) Foreign Application Priority Data
Apr. 26, 2016 (JP) .............................. JP2016-088019

(51) Int. Cl.
*G10L 15/22* (2006.01)
*G10L 25/63* (2013.01)
*G10L 15/02* (2006.01)

(52) U.S. Cl.
CPC .............. *G10L 15/22* (2013.01); *G10L 15/02* (2013.01); *G10L 25/63* (2013.01)

(58) Field of Classification Search
None
See application file for complete search history.

(56) References Cited

U.S. PATENT DOCUMENTS 6,304,846 B1 * 10/2001 George ................. G10L 13/033
704/E13.004
6,658,388 B1 * 12/2003 Kleindienst ............. G10L 13/00
704/E15.04

(Continued)

FOREIGN PATENT DOCUMENTS

JP 2001-083984 A 3/2001
JP 2004-349851 A 12/2004

(Continued)

OTHER PUBLICATIONS

International Search Report and Written Opinion dated Apr. 18, 2017, from International Application No. PCT/JP2017/004761, 10 sheets.

(Continued)

*Primary Examiner* — Thuykhanh Le
(74) *Attorney, Agent, or Firm* — Katten Muchin Rosenman LLP

(57) ABSTRACT

An information processing apparatus determines, on the basis of a speech of a user to be evaluated, a reference feature quantity representing a feature of the user's speech at normal times, acquires audio feature quantity data of a target speech to be evaluated made by the user, and evaluates the feature of the target speech on the basis of a comparison result between the audio feature quantity of the target speech and the reference feature quantity.

15 Claims, 4 Drawing Sheets

(56) References Cited

U.S. PATENT DOCUMENTS

| | | | | |
|---|---|---|---|---|
| 7,137,008 B1* | 11/2006 | Hamid | G06F 21/31 | 713/182 |
| 7,684,984 B2* | 3/2010 | Kemp | G10L 15/065 | 704/235 |
| 8,639,516 B2* | 1/2014 | Lindahl | G10L 21/0208 | 704/275 |
| 8,798,242 B1* | 8/2014 | Sankaranarayanan | H04M 3/51 | 379/265.03 |
| 2002/0116186 A1* | 8/2002 | Strauss | G10L 25/78 | 704/E11.003 |
| 2003/0009341 A1* | 1/2003 | Cheng | A61B 5/7475 | 704/275 |
| 2003/0130851 A1* | 7/2003 | Nakakita | A63H 3/28 | 704/275 |
| 2004/0235531 A1* | 11/2004 | Anzawa | H04M 1/72427 | 455/563 |
| 2006/0170945 A1* | 8/2006 | Bill | H04L 51/04 | 358/1.13 |
| 2007/0003914 A1* | 1/2007 | Yang | G10L 17/26 | 703/11 |
| 2007/0198263 A1* | 8/2007 | Chen | G10L 15/065 | 704/E15.009 |
| 2007/0271098 A1* | 11/2007 | Stewart | G10L 15/08 | 704/E17.002 |
| 2008/0059158 A1* | 3/2008 | Matsuo | H04M 1/21 | 704/E11.001 |
| 2010/0036660 A1* | 2/2010 | Bennett | G10L 15/30 | 704/231 |
| 2010/0094634 A1* | 4/2010 | Park | G10L 21/06 | 704/E21.001 |
| 2011/0231194 A1* | 9/2011 | Lewis | G10L 21/06 | 704/E21.019 |
| 2011/0295607 A1* | 12/2011 | Krishnan | G10L 17/26 | 704/E11.001 |
| 2012/0005701 A1* | 1/2012 | Quan | H04H 60/37 | 704/235 |
| 2012/0089705 A1* | 4/2012 | French | G06Q 30/0601 | 709/224 |
| 2012/0150541 A1* | 6/2012 | Talwar | G10L 15/065 | 704/E15.005 |
| 2012/0197629 A1* | 8/2012 | Nakamura | G10L 15/26 | 704/E15.003 |
| 2013/0030812 A1* | 1/2013 | Kim | G10L 15/22 | 704/E11.001 |
| 2013/0231922 A1* | 9/2013 | Park | G06F 40/30 | 704/9 |
| 2014/0025383 A1* | 1/2014 | Dai | G10L 13/00 | 704/260 |
| 2014/0025385 A1* | 1/2014 | Atri | H04N 21/4394 | 704/270 |
| 2014/0067375 A1* | 3/2014 | Woofers | G06F 40/35 | 704/9 |
| 2014/0122091 A1* | 5/2014 | Cross, Jr. | G10L 17/00 | 704/275 |
| 2014/0188459 A1* | 7/2014 | Fink | G06F 40/30 | 704/9 |
| 2014/0249823 A1* | 9/2014 | Hayakawa | G10L 25/63 | 704/270 |
| 2014/0270707 A1* | 9/2014 | Fathi | G06V 40/20 | 386/278 |
| 2014/0343943 A1* | 11/2014 | Al-Telmissani | G06F 21/32 | 704/246 |
| 2015/0039299 A1* | 2/2015 | Weinstein | G10L 15/16 | 704/202 |
| 2015/0170674 A1* | 6/2015 | Ishibashi | G10L 25/48 | 704/270 |
| 2015/0248883 A1* | 9/2015 | Ganong, III | G10L 15/1815 | 704/251 |
| 2015/0264505 A1* | 9/2015 | Tsilfidis | H04R 27/00 | 381/303 |
| 2015/0269857 A1* | 9/2015 | Feng | G09B 7/00 | 434/353 |
| 2015/0287410 A1* | 10/2015 | Mengibar | G06Q 30/0269 | 704/246 |
| 2015/0302868 A1* | 10/2015 | Sikveland | G10L 25/51 | 704/239 |
| 2015/0310877 A1* | 10/2015 | Onishi | G10L 17/00 | 704/246 |
| 2015/0324348 A1* | 11/2015 | Peterson | G06F 40/169 | 704/9 |
| 2015/0348538 A1* | 12/2015 | Donaldson | G10L 15/26 | 704/235 |
| 2015/0363387 A1* | 12/2015 | Blaschak | G06Q 30/0203 | 704/9 |
| 2016/0044018 A1* | 2/2016 | Grosskopf | H04L 67/10 | 726/5 |
| 2016/0086597 A1* | 3/2016 | Matsubara | G10L 13/0335 | 704/243 |
| 2016/0133257 A1* | 5/2016 | Namgoong | G06F 3/16 | 704/235 |
| 2016/0140226 A1* | 5/2016 | Murgai | G10L 25/90 | 704/251 |
| 2016/0148616 A1* | 5/2016 | Takayanagi | G10L 15/25 | 704/235 |
| 2016/0163333 A1* | 6/2016 | Totzke | G06Q 10/10 | 704/235 |
| 2016/0196836 A1* | 7/2016 | Yu | G10L 25/63 | 704/207 |
| 2016/0240213 A1* | 8/2016 | Wen | G10L 25/63 | |
| 2017/0223189 A1* | 8/2017 | Meredith | G10L 25/03 | |
| 2017/0236520 A1* | 8/2017 | Borgstrom | G10L 17/12 | 704/239 |

FOREIGN PATENT DOCUMENTS

| | | |
|---|---|---|
| JP | 2008-76904 A | 4/2008 |
| JP | 2013-72979 A | 4/2013 |
| JP | 2014-178835 A | 9/2014 |

OTHER PUBLICATIONS

Kikuo Maekawa and Hiroki Mori, "Voice-Quality Analysis of Japanese Filled Pauses: A Preliminary Report", [online], [searched Nov. 16, 2015(H27)], internet <URL:http://www2.ninjal.ac.jp/kikuo/Maekawa-DISS2015.pdf>, Dept. Corpus Studies, National Institute for Japanese Language and Linguistics Graduate School of Engineering, Utsunomiya University, 4 sheets.

Ryosuke Ito et al., "Analysis and Detection of Emotional States in Spoken Dialogue with Robot", IPSJ SIG Notes, Feb. 8, 2003 (Feb. 8, 2003), vol. 2003, No. 14, pp. 107 to 112.

Minoru Shigenaga, "Characteristic Features of Emotionally Uttered Speech Revealed by Discriminant Analysis (VIII), Use of Neural Networks", IEICE Technical Report, May 18, 2001 (May 18, 2001), vol. 101, No. 87, pp. 29 to 34.

Masahiro Harada et al., "Jimaku Seisei System eno Kanjo Onsei no Hyogen ni Tsuite", The Acoustical Society of Japan (ASJ) 2008 Nen Shunki Kenkyu Happyokai Koen Ronbunshu CD-ROM, Mar. 10, 2008 (Mar. 10, 2008), pp. 259 to 260.

Naoyuki Matsuzawa et al., "Shizen Taiwachu no Hatsuwatsui ni Okeru Onkyo Tokuchoryo ni Motozuku Kanjo no Teido Suitei", Information Processing Society of Japan Dai 75 Kai Zenkoku Taikai Koen Ronbunshu, Mar. 6, 2013 (Mar. 6, 2013), pp. 2-503 to 2-504.

Minoru Shigenaga, "Characteristic Features of Emotionally Uttered Speech Revealed by Discriminant Analysis (VII) on Open Discrimination", IEICE Technical Report, Jan. 20, 2000 (Jan. 20, 2000), vol. 99, No. 576, pp. 21 to 28.

Notification of Reasons for Refusal dated Feb. 18, 2020, from Japanese Patent Application No. 2018-514129, 6 sheets.

* cited by examiner

| REFERENCE FEATURE QUANTITY | UPPER LIMIT | LOWER LIMIT |
|---|---|---|
| AVERAGE PITCH | U1 | L1 |
| AVERAGE VOLUME | U2 | L2 |
| AVERAGE PITCH OF TIME INTERVAL T1 | U3 | L3 |
| AVERAGE PITCH OF TIME INTERVAL T2 | U4 | L4 |
| ⋮ | ⋮ | ⋮ |

# INFORMATION PROCESSING APPARATUS

TECHNICAL FIELD

The present invention relates to an information processing apparatus, an information processing method, a program, and an information storage medium for evaluating a feature of a user's speech.

BACKGROUND ART

An information processing apparatus is known that accepts a voice produced by a user and performs information processing in accordance with content of the voice. According to such a technology, the user can enter a variety of instructions and pieces of information by voice instead of manually entering text with a keyboard or a touch panel. Also, a study is underway to find out about emotion, attitude, and so on other than the content of the speech from the user's speech (refer, for example, to NPL 1). According to such a technology, it is possible to perform a variety of information processing tasks in according with a user's emotion and so on included in a speech.

CITATION LIST

Non Patent Literature

NPL 1

Kikuo Maekawa and Hiroki Mori, "VOICE-QUALITY ANALYSIS OF JAPANESE FILLED PAUSES: A PRELIMINARY REPORT," [online], [searched Nov. 16, 2015 (H27)], internet <URL:http://www2.ninjal.ac.jp/kikuo/Maekawa-DISS2015.pdf>

SUMMARY

Technical Problem

In the above prior art, there are cases where a feature of a user's speech cannot be evaluated with accuracy because of individual differences in user's manner of speaking.

The present invention has been devised in light of the above circumstances, and it is an object of the present invention to provide an information processing apparatus, an information processing method, a program, and an information storage medium that permit evaluation of a feature of a user's speech with more accuracy.

Solution to Problem

An information processing apparatus according to the present invention includes a reference feature quantity determination section, a speech feature quantity acquisition section, and an evaluation section. The reference feature quantity determination section determines, on the basis of a speech of a user to be evaluated, a reference feature quantity representing a feature of the user's speech at normal times. The speech feature quantity acquisition section acquires audio feature quantity data of a target speech to be evaluated made by the user. The evaluation section evaluates the feature of the target speech on the basis of a comparison result between the audio feature quantity of the target speech and the reference feature quantity.

An information processing method according to the present invention includes a step of determining a reference feature quantity representing a feature of a user's speech at normal times on the basis of the user's speech to be evaluated, a step of acquiring audio feature quantity data of a target speech to be evaluated made by the user, and a step of evaluating the feature of the target speech on the basis of a comparison result between the audio feature quantity of the target speech and the reference feature quantity.

A program according to the present invention is a program that causes a computer to function as a reference feature quantity determination section, a speech feature quantity acquisition section, and an evaluation section. The reference feature quantity determination section determines, on the basis of a user's speech to be evaluated, a reference feature quantity representing a feature of the user's speech at normal times. The speech feature quantity acquisition section acquires audio feature quantity data of a target speech to be evaluated made by the user. The evaluation section evaluates the feature of the target speech on the basis of a comparison result between the audio feature quantity of the target speech and the reference feature quantity. The program may be provided by being stored in a non-transitory computer-readable information storage medium.

DESCRIPTION OF EMBODIMENT

A detailed description will be given below of an embodiment of the present invention based on drawings.

Figure 1:
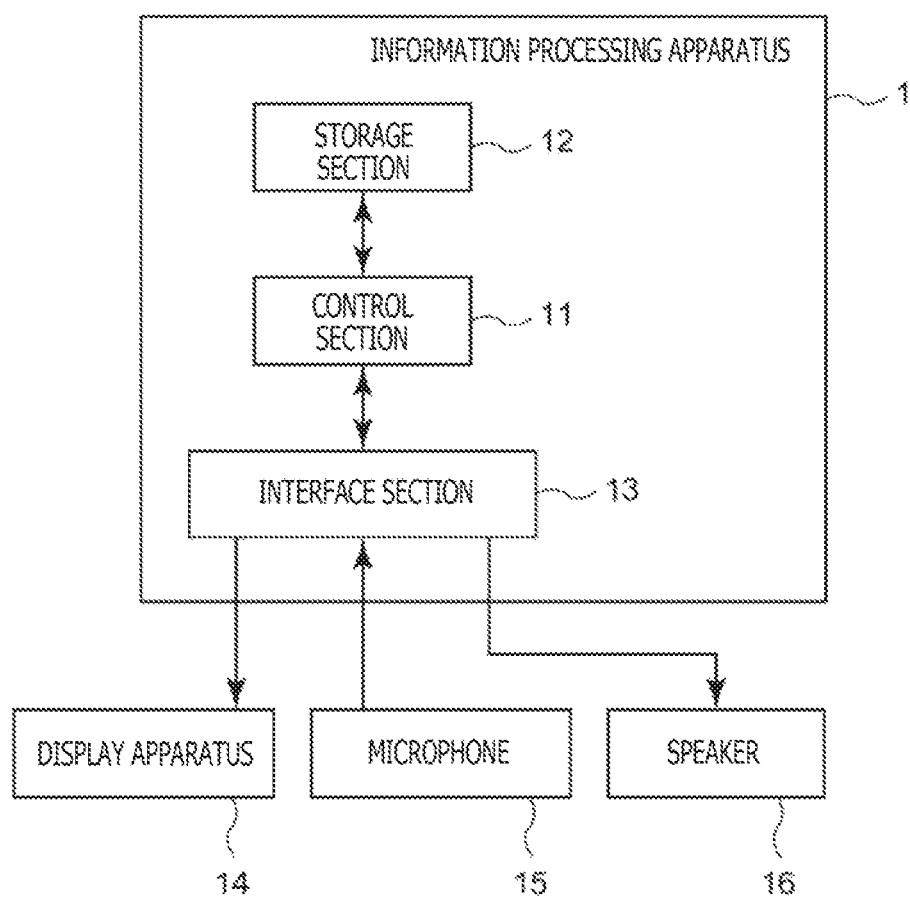
FIG. 1 is a configuration block diagram illustrating a configuration of an information processing apparatus according to an embodiment of the present invention.

FIG. 1 is a configuration block diagram illustrating a configuration of an information processing apparatus 1 according to an embodiment of the present invention. The information processing apparatus 1 is, for example, a home gaming console, a portable gaming console, a personal computer, a smartphone, or other apparatus and includes a control section 11, a storage section 12, and an interface section 13 as illustrated in FIG. 1. Also, the information processing apparatus 1 is connected to a display apparatus 14, a microphone 15, and a speaker 16.

The control section 11 includes a central processing unit (CPU) and so on and performs a variety of information processing tasks by executing a program stored in the storage section 12. Specific examples of processes performed by the control section 11 in the present embodiment, will be described later. The storage section 12 includes a memory device such as random access memory (RAM) and stores a program executed by the control section 11 and data processed by the program. The interface section 13 is an interface for the information processing apparatus 1 to exchange a variety of pieces of information with the display apparatus 14, the microphone 15 and the speaker 16.

The display apparatus 14 is a head mounted display, a home TV receiver, a liquid crystal display, or other apparatus and displays, on the screen, an image matching a video signal output from the information processing apparatus 1. The microphone 15 outputs, to the information processing apparatus 1, an audio signal acquired by collecting the voice produced by the user of the information processing apparatus 1. The speaker 16 produces a sound in accordance with an audio signal output from the information processing apparatus 1. It should be noted that the display apparatus 14, the microphone 15, and the speaker 16 may each be incorporated in the housing of the information processing apparatus 1 or be a separate apparatus connected to the information processing apparatus 1 in a wired or wireless manner.

Figure 2:
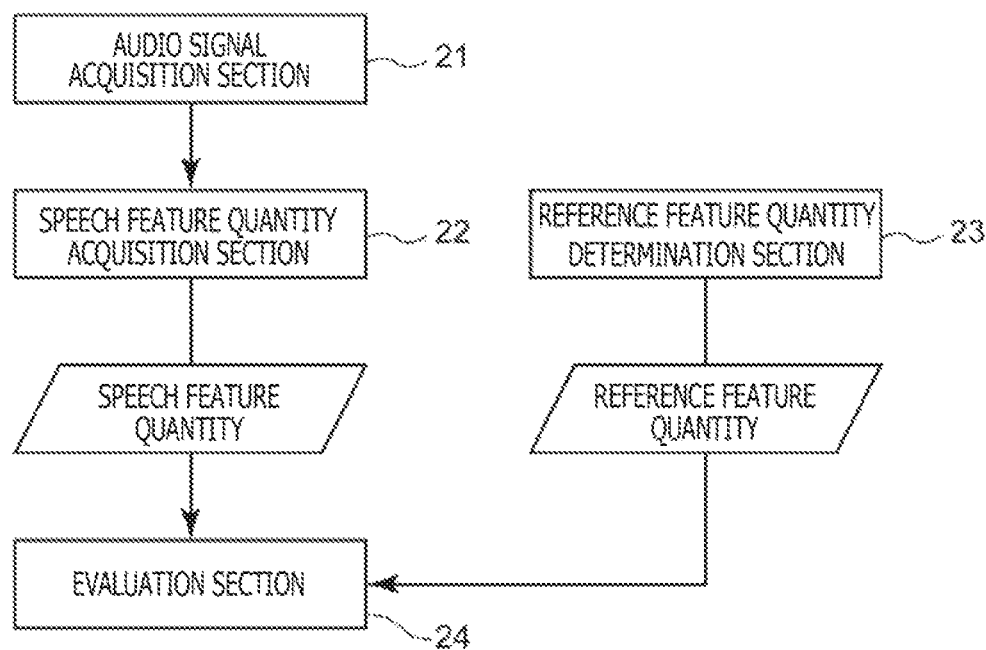
FIG. 2 is a functional block diagram illustrating functions of the information processing apparatus according to an embodiment of the present invention.

A description will be given below of functions realized by the information processing apparatus using FIG. 2. As illustrated in FIG. 2, the information processing apparatus 1 functionally includes an audio signal acquisition section 21, a speech feature quantity acquisition section 22, a reference feature quantity determination section 23, and an evaluation section 24. These functions are realized as a result of the control section 11 operating in accordance with the program stored in the storage section 12. This program may be provided to the information processing apparatus 1 via a communication network such as the Internet or may be provided and stored in a computer-readable information storage medium such as optical disc.

The audio signal acquisition section 21 acquires an audio signal collected by the microphone 15 and outputs the audio signal to the speech feature quantity acquisition section 22. In the present embodiment, the information processing apparatus 3 accepts a user's speech to be evaluated and evaluates a feature thereof. The audio signal acquired by the audio signal acquisition section 21 includes a voice when this user produces a speech. In the description given below, a user to be evaluated will be referred to as a target user. Also, a speech of a target user to be evaluated will be referred to as a target speech.

In the present embodiment in particular, the information processing apparatus 1 executes an application program that realizes a dialog between a virtual agent and a target user. A statement made by the agent to the target user may be displayed on the screen of the display apparatus 14 or reproduced as voice from the speaker 16. A speech made by the target user in response to this statement is a target speech. The evaluation section 24 which will be described later estimates an emotion of the target user included in the target speech by evaluating a feature of the target speech.

The speech feature quantity acquisition section 22 extracts waveform data representing the target user's voice from the audio signal acquired by the audio signal acquisition section 21 and acquires an audio feature quantity value representing a feature of a target speech by performing an analysis process on the waveform data. In the description given below, an audio feature quantity representing a feature of a target speech will be referred to as a speech feature quantity.

The speech feature quantity acquisition section 22 may acquire a plurality of kinds of speech feature quantity values. For example, the speech feature quantity acquisition section 22 acquires, as a speech feature quantity value, a statistic of an entire target speech for each of features such as volume (amplitude) of the target user's voice, pitch (frequency), speech speed, and so on. Here, a statistic of each feature may be an average, a standard deviation, a maximum, a minimum, a range (difference between the maximum and minimum), or the like during the time interval of the entire target speech.

Also, speech feature quantities may include statistics representing changes over time of these features. Specifically, the speech feature quantity acquisition section 22 calculates, using a central difference method or other method and for each of a plurality of sampling timings included in the time interval of the entire target speech, a derivative representing a change over time of a volume or a pitch. Then, the average, maximum, minimum, standard deviation, and so on of the derivative calculated for each sampling timing in the entire target speech are acquired as speech feature quantities. As an example, when the target user is surprised, there is a possibility that the volume and the pitch may vary significantly during a single speech. It is probable that features such as changes over time in the course of such a speech do not manifest themselves in the volume and pitch statistics in the entire target speech. For this reason, it is possible to obtain a speech feature quantity that represents such a change during a single speech by acquiring statistics of the derivative as a speech feature quantity.

Figure 3:
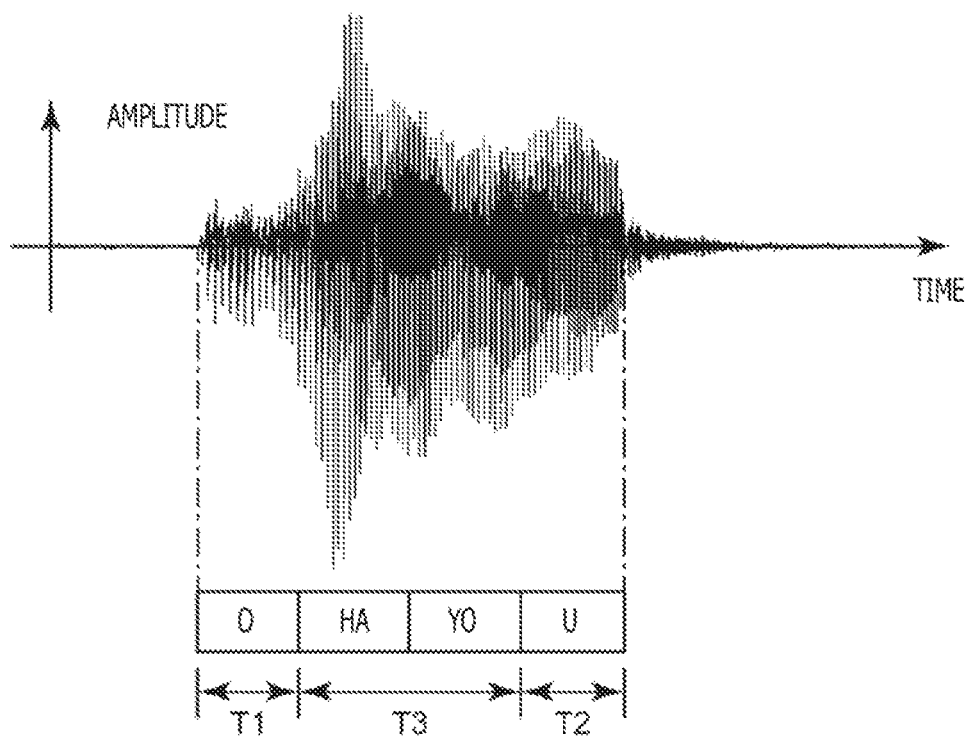
FIG. 3 is a diagram illustrating an example of a time interval subject to acquisition of a speech feature quantity.

Further, the speech feature quantity acquisition section 22 may acquire, as a speech feature quantity regarding a change during a single speech, an audio feature quantity for a partial time interval of the entire target speech. More specifically, the speech feature quantity acquisition section 22 calculates the average volume, the average pitch, or other feature quantity for the first (speaking start) time interval of the entire target speech, for the last (speaking end) time interval thereof, or for other time interval. FIG. 3 illustrates a first time interval T1 and a last time interval T2 in the case where the target speech is "Ohayou (good morning)." Here, each time interval may be the first or last time interval of a given length in the entire target speech. The given length may be defined in number of seconds, number of moras, number of words, or other length. In the example illustrated in FIG. 3, the time intervals T1 and 72 are defined to be one mora in length, individually. It is possible to grasp features of a speech such as large volume at the start of speaking and small volume at the end of speaking by acquiring a speech feature quantity for each of these time intervals T1 and T2. Also, the speech feature quantity acquisition section 22 may acquire a speech feature quantity for a time interval T3 provided halfway other than the first time interval T1 and the last time interval 72, as illustrated in FIG. 3.

Although, in the example illustrated in FIG. 3, the length of the time interval for which a speech feature quantity is to be acquired is a predetermined fixed length, the time interval length may be variable. For example, the time intervals T1 and T2 may be defined by ratios relative to the length of the entire target speech, individually. Further, the speech feature quantity acquisition section 22 may acquire, as a speech feature quantity, a value representing the difference between the feature quantity acquired for the first time interval T1 and the feature quantity acquired for the second time interval T2. This makes it possible to acquire a speech feature quantity representing the difference in volume or pitch between the beginning and end of the target speech.

Also, the speech feature quantity acquisition section 22 may acquire, as a speech feature quantity, an elapsed time from when the information processing apparatus 1 makes an output to prompt a target user to produce a speech until the target user begins to produce a target speech. Specifically, the speech feature quantity acquisition section 22 measures the elapsed time from reproduction of an agent's question until the target user produces a speech. This elapsed time may include the time during which the target user produces a speech recognized as a filler (i.e., utterance that linguistically has no meaning such as "Uh" and "Ah").

The evaluation section 24 evaluates the feature of the target speech on the basis of the speech feature quantity acquired by the speech feature quantity acquisition section 22. Specifically, the evaluation section 24 evaluates the target speech by comparing the speech feature quantity acquired by the speech feature quantity acquisition section 22 with a reference feature quantity. The reference feature quantity determination section 23 determines a reference feature quantity used for this evaluation.

Here, a reference feature quantity is an audio feature quantity representing a feature of a target user's speech at normal times (i.e., speech not indicating any strong emotion) and is determined on the basis of an actual speech of the target user. The reference feature quantity determination section 23 determines a reference feature quantity for the same kind of audio feature quantity as the speech feature quantity acquired by the speech feature quantity acquisition section 22. A reference feature quantity is a quantity representing an approximate voice volume, an approximate voice pitch, an approximate speed or the like with which the target user speaks at normal times.

In the description given below, the reference feature quantity determination section 23 accepts an actual speech that is assumably a user's speech at normal times and determines a reference feature quantity from a feature of that speech. Specifically, the reference feature quantity determination section 23 accepts a target user's speech at normal times before a target speech to be evaluated such as timing when the target user begins to use the information processing apparatus 1 and calculates the audio feature quantity thereof. This allows the reference feature quantity determination section 23 to determine the reference feature quantity representing the feature of the target user's speech at normal times. In the description given below, a target user's advance speech used for calculating a reference feature quantity will be referred to as a reference speech.

Figures 4, 5:
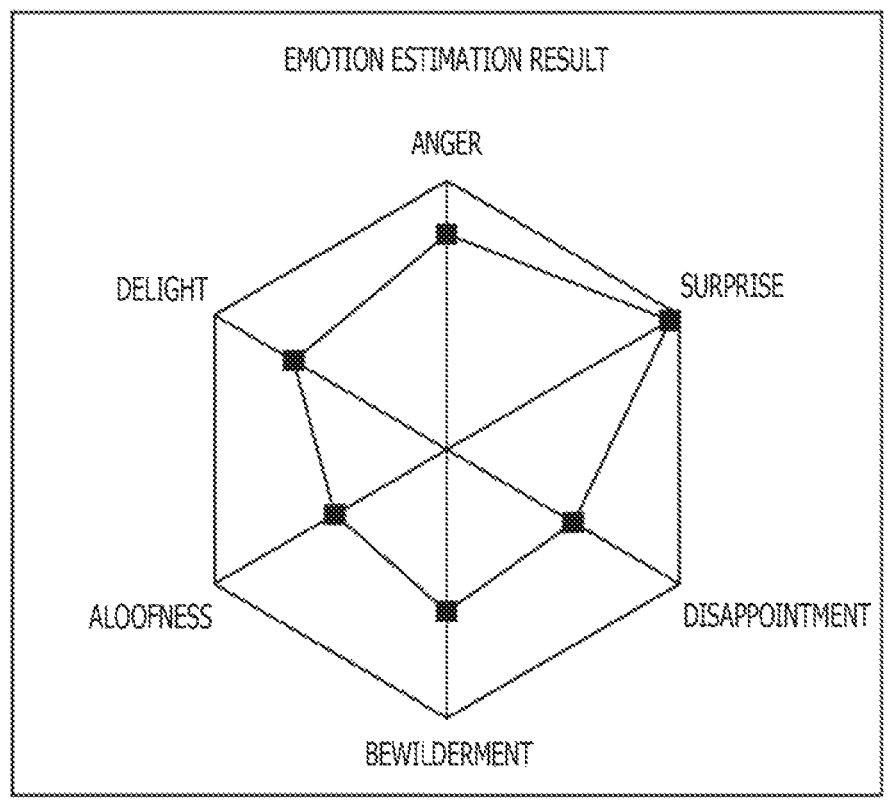
FIG. 4 is a diagram illustrating an example of reference feature quantity data.
FIG. 5 is a diagram illustrating a display example of an evaluation result.

In the present embodiment in particular, a reference feature quantity is calculated on the basis of a plurality of reference speeches made by a target user. One does not necessarily always speak in a uniform manner even at normal tames. For this reason, it is preferable to determine a reference feature quantity using a plurality of reference speeches. The reference feature quantity determination section 23 may use the average of the feature quantity value acquired for each of a plurality of reference speeches as a reference feature quantity value. However, the reference feature quantity value is not limited thereto, and the reference feature quantity determination section 23 may acquire data representing the fluctuation range of the feature quantity at normal times as a reference feature quantity. As for volume, for example, there is probably not only an individual difference in absolute value of the volume among people, with some people speaking loudly and other people speaking quietly, but also an individual difference in fluctuation range of the volume among people, with some people always speaking with a constant volume and other people speaking with a varying volume from moment to moment. For this reason, by defining a reference feature quantity with a numerical value range representing a feature quantity's fluctuation range, it is possible to reflect such an individual difference in fluctuation range in the reference feature quantity. FIG. 4 illustrates an example of reference feature quantity data representing such a fluctuation range. In the example illustrated in this figure, a reference feature quantity is defined for each feature quantity such as volume or pitch by upper and lower limits of the range of values which the feature quantity can take on at normal times. In this case, upper and lower limits may be determined on the basis of the average, the variance, the maximum, the minimum, or other value of the audio feature quantity calculated for each of a plurality of reference speeches.

A description will be given here of several examples of acquiring audio data of a reference speech used for calculating a reference feature quantity. For example, the reference feature quantity determination section 23 acquires reference speech audio data by displaying, on the screen of the display apparatus 14, a message having content in which the user assumably does not include much emotion and by having the target user read cut the message. Such acceptance of a reference speech may be performed, for example, at the time of registration of the user profile when the target user begins to use the information processing apparatus 1.

Also, in the case where the information processing apparatus 1 performs a dialog process with an agent, the target user's speech immediately after the beginning of a dialog may be used as a reference speech. The reason for this is that, assumably, statements with strong emotions are not made immediately after the start of a dialog because of exchange of greetings and other words for the first meeting. Such a process eliminates the need to go to the trouble of specially prompting the target user to make a reference speech in order to calculate a reference feature quantity.

In the case where a plurality of users use the information processing apparatus 1, the reference feature quantity determination section 23 calculates a feature quantity for each user and stores the feature quantities in the storage section 12. Also, reference feature quantity data stored in the storage section 12 may be updated regularly on the basis of new reference speech audio data. The reason for this is that features of user's manners of speaking may change over time. Also, in the case where the information processing apparatus 1 realizes a plurality of kinds of agents, a reference feature quantity may be calculated and stored individually for each kind of agent who is a dialog companion even if the target user is the same. In this case, the target user's speech during a dialog with a corresponding agent is used as a reference speech. This makes it possible to acquire a reference feature quantity that will be used as a reference for speaking with each agent in the case where the target user's manner of speaking changes with change of the agent who is a dialog companion.

The evaluation section 24 evaluates a feature of a target speech on the basis of a comparison result between a speech feature quantity acquired for the target speech and a reference feature quantity as described earlier. Specifically, in the case where a reference feature quantity is defined by a single numerical value, the evaluation section 24 performs a target speech evaluation process using the difference between the speech feature quantity and the reference feature quantity. Also, in the case where the reference feature quantity is defined by a range of numerical values, the evaluation section 24 determines whether the speech feature quantity value is included in the numerical value range, exceeds the upper limit of the numerical value range, or falls below the lower limit thereof. Then, the evaluation section 24 performs an evaluation process using the determination result. Alternatively, in the case where the speech feature quantity is not included in the numerical value range of the reference feature quantity, the evaluation process may be performed using the difference with the boundary value of that numerical value range.

The evaluation section 24 performs a specific evaluation process in accordance with an evaluation criterion made available in advance. This evaluation criterion is realized as an estimation engine that has, as its input, the comparison result between the speech feature quantity and the reference feature quantity and has, as its output, the evaluation result of the target speech. Such an estimation engine may be generated artificially on the basis of a result of an experiment conducted on subjects in advance or by a technique such as supervised machine learning. The output of the estimation engine may be a numerical value representing, for each of a plurality of emotional indices, how much possibility there is that that emotion is included in the target speech. The emotional indices here are anger, surprise, disappointment, bewilderment, delight, and aloofness. By calculating a numerical value for each of these emotional indices, it is possible to estimate, for example, that in the case where the volume of the target speech is larger than at normal times, the target user is highly likely surprised or angry.

What is noteworthy here is that the evaluation criterion itself used by the estimation engine can be generated by sample data obtained from other subject different from the target user and is used commonly tor a plurality of target users. The inventors of the present application set up the following hypothesis and verified it. That is, the hypothesis goes that, although there is an individual difference in audio feature quantity of a speech, the audio feature quantity per speech obeys a statistical distribution centered on normal times (state in which one is emotionally neutral), and that, then, the change of the speech feature quantity in which an emotion has been included relative to the speech feature quantity at normal times exhibits the same tendency as a whole although there is some individual difference from one subject to another. As a result of study, the inventors of the present application have acquired a verification result supporting the adequacy of this hypothesis. From this, by using a comparison result between a reference feature quantity and a speech feature quantity acquired for each target user, it is possible to accommodate individual differences in speech voice and make relatively accurate estimation in emotion without making available an individual estimation engine for each target user.

It should be noted, however, that the evaluation section 24 may make available a plurality of kinds of evaluation criteria in advance and perform an evaluation process for the target user using one of the evaluation criteria. In this case, the plurality of evaluation criteria used by the evaluation section 24 are targeted for different user groups. These user groups classify a plurality of users such that users whose speech features exhibit close tendencies belong to the same group. At the time of actual evaluation, the evaluation section 24 identifies to which user group of the plurality of user groups the target user belongs on the basis of the reference feature quantity determined for the target user. Then, the evaluation section 24 evaluates the target speech in accordance with the evaluation criterion targeted for that user group. This contributes to a higher likelihood of highly accurate evaluation even for a target user who has a tendency of change in speech feature quantity arising from emotion different from ordinary people.

The information processing apparatus 1 performs a variety of processes thereafter using the evaluation result produced by the evaluation section 24. In a dialog process with an agent, for example, the information processing apparatus 1 determines the content of the agent's statement thereafter by reflecting the target user's emotion represented by the evaluation result and outputs the statement. Also, the evaluation section 24 may present the evaluation result itself to the user by displaying the evaluation result on the screen of the display apparatus 14. FIG. 5 illustrates a display example of an evaluation result. The example of this figure depicts, with a radar chart, numerical values, each indicating the level of one of six kinds of emotional indices. In the example of this figure, emotions that exhibit relatively close tendencies relating to the speech feature quantity are arranged to be adjacent whereas emotions that are not highly relevant are arranged to be opposed. The plurality of kinds of emotions to be estimated are not independent of each other, and there is a possibility that a user may produce a speech with relatively close kinds of emotions mixed and that it may be impossible to clearly identify which of the plurality of kinds of emotions exhibiting a strong correlation the user has. For this reason, by displaying an emotional estimation result in such a manner that, highly correlated emotional indices are adjacent, it is possible to grasp the user's emotion with more ease than in the case where each index value is displayed separately.

Figure 6:
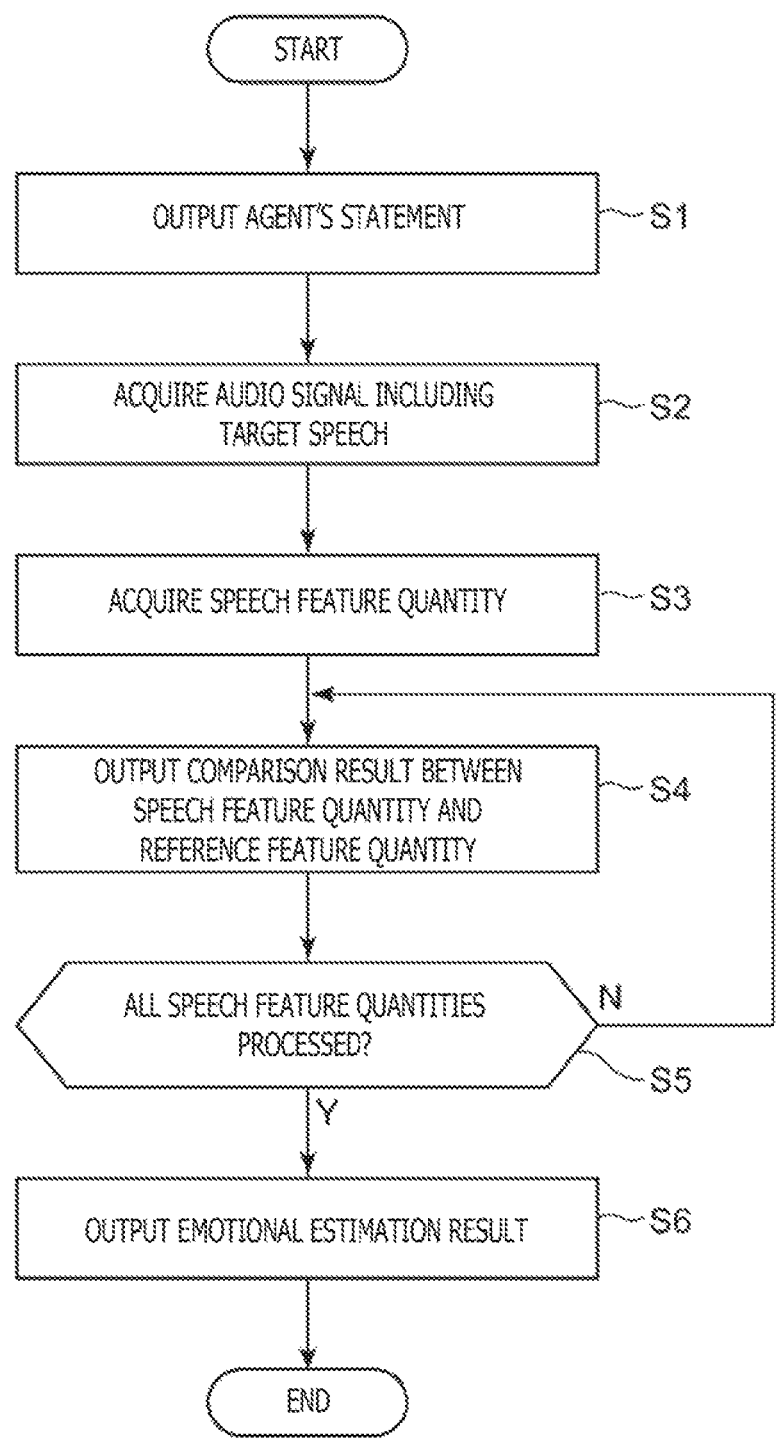
FIG. 6 is a flowchart illustrating an example of a flow of processes performed by the information processing apparatus according to an embodiment of the present invention.

A description will be given here of an example of a flow of processes performed fay the control section 11 of the information processing apparatus 1 at the time of evaluation of a target speech using the flowchart illustrated in FIG. 6.

First, the control section 11 outputs an agent's statement first (S1). Then, the audio signal acquisition section 21 acquires an audio signal including a response (target speech) of a target user to that statement (S2). Next, the speech feature quantity acquisition section 22 acquires a plurality of kinds of speech feature quantities through an analysis process targeted for the audio signal acquired in S2 (S3).

Thereafter, the evaluation section 24 compares the reference feature quantity determined by the reference feature quantity determination section 23 with the speech feature quantity calculated in S3 and outputs a comparison result. Specifically, the evaluation section 24 compares each of the plurality of kinds of speech feature quantities acquired in S3 with the numerical value range of the reference feature quantity and outputs a comparison result indicating whether the speech feature quantity is included in the numerical value range, exceeds the upper limit, or falls below the lower limit (S4). These processes are repeated for ail the kinds of speech feature quantity values acquired in S3 (S5). Further after that, the evaluation section 24 performs an emotional evaluation process based on an estimation engine by using each of the speech feature quantity comparison results output in S4 and outputs an emotional estimation result (S6). As a result, an estimation result of the target user's emotion included in the target speech can be obtained.

The information processing apparatus 1 according to the present embodiment described above can accommodate, if any, individual differences in speech feature quantity at normal times such as some with loud voice and others with low voice to highly accurately evaluate the emotion included in the target speech to be evaluated.

It should be noted that the embodiment of the present invention is not limited to that described above. For example, the evaluation section 24 may use various audio feature quantities other than those described above as speech feature quantities and reference feature quantities. Also, although, in the above description, the speech feature quantity acquisition section 22 calculates speech feature quantities by itself, speech feature quantity data calculated by other computer may be acquired. Also, the information processing apparatus 1 may be a server apparatus or other apparatus connected via a communication network rather than a local apparatus located right beside the user. In this case, the information processing apparatus 1 receives speech feature quantity data from a local apparatus and compares it with the reference feature quantity held by itself for an evaluation process. Then, the information processing apparatus 1 sends the evaluation result to the local apparatus.

Also, although, in the above description, the evaluation section 24 estimates the emotion included in the target speech through an evaluation process, the evaluation section 24 is not limited thereto, and the evaluation section 24 may estimate, for example, a fatigue level or other level of the target user who produced a speech. Also, in the above description, the information processing apparatus 1 realized a virtual agent that converses with a target user, and the target speech was a speech for the target user to respond to a statement made by the agent. However, the target speech is not limited to this and may be one of a variety of speeches such as target, user's speech at the time of audio entry or a target user's speech during conversation with other user. Also, the target speech may be that which is included in audio waveform data stored in the storage section 12 in advance rather than that included in an audio signal acquired by the microphone 15.

Also, in the above description, the reference feature quantity determination section 23 accepted a target user's speech at normal times (i.e., speech in which no strong emotion was included) as a reference speech and used a feature quantity calculated for that reference speech as a reference feature quantity. However, the method for determining a reference feature quantity is not limited thereto. For example, the information processing apparatus 1 may hold, in advance, a plurality of reference feature quantity candidates that are likely used as a target user's reference feature quantity. A detailed description will be given below of a specific example of this case.

Reference feature quantity candidates in this example are determined on the basis of sample data of actual speeches produced by a plurality of other speakers (sample speakers) different from the target user. Specifically, the information processing apparatus 1 holds reference feature quantity determination data that associates a category to which a speaker and a speech produced by the speaker belong, audio feature quantity data (comparison feature quantity data) calculated on the basis of a feature of the sample speech that fails under the category, a reference feature quantity candidate indicating the feature of the speech at normal times produced by the speaker that belongs to the category. In this example, the category may be a combination of various attributes regarding a speaker and a speech of the speaker. Speaker's sex, age, and voice quality can be cited as attributes regarding a speaker. Also, an emotion included in a speech can be cited as a speech feature. For example, in the case where audio feature quantity data obtained when a sample speaker who is a male in his 20's with a low natural voice produces a sample speech with anger is recorded as sample speech data in association with the (20's, male, low voice, anger) category identified by a combination of attribute values thereof. Also, the audio feature quantity of a speech produced by the sample speaker with no emotion (normal time speech) is recorded together therewith. By collecting a number of pieces of such sample data, comparison feature quantity data is calculated from a plurality of pieces of sample speech data obtained for the same category. It should be noted that comparison feature quantity data may be a typical value (e.g., average) calculated for a plurality of kinds of audio feature quantities or data that specifies a numerical value range tor each audio feature quantity. Also, reference feature quantity candidate data is generated on the basis of audio feature quantity data of a normal time speech of the sample speaker who produced that sample speech. It should be noted that reference feature quantity candidate data may be determined from the audio feature quantity of the normal time speech produced by the sample speaker by a technique similar to the calculation method used to determine a reference feature quantity on the basis of a reference speech regarding a target user in the working example described earlier.

The reference feature quantity determination section 23 determines a reference feature quantity from an actual reference speech of the target user by using reference feature quantity determination data obtained from the technique described above. One should keep in mind that, unlike the working example described earlier, a reference speech accepted from a target user is not limited to that at normal times and may be a speech in which an emotion is included in this example using reference feature quantity determination data. Specifically, the reference feature quantity determination section 23 calculates an audio feature quantity of a target user's reference speech and identifies comparison feature quantity data with which the calculated audio feature quantity agrees most. For example, in the case where it is determined that the audio feature quantity of a reference speech obtained from a target user is closest to comparison feature quantity data associated with the (20's, male, low voice, anger) category of a plurality of categories included in the reference feature quantity determination data, the reference feature quantity determination section 23 estimates that the target, user's reference speech is a speech that belongs to this category and determines the reference feature quantity candidate data associated with the category in question as a reference feature quantity for use in subsequent processes. Such a technique makes it possible to acquire a reference feature quantity that is assumed to represent a target user's speech feature at normal times without the target user producing any normal time speech as a reference speech.

REFERENCE SIGNS LIST

1: Information processing apparatus
11: Control section
12: Storage section
13: Interface section
14: Display apparatus
15: Microphone
16: Speaker
21: Audio signal acquisition section
22: Speech feature quantity acquisition section
23: Reference feature quantity determination section
24: Evaluation section

The invention claimed is:
1. An information processing apparatus comprising:
by a reference feature quantity determination section, determining a reference feature quantity representing a feature of a user's speech at normal times from a plurality of reference speeches,
wherein a first reference speech of the plurality of reference speeches is acquired immediately after a first interaction with the user in response to a greeting displayed to the user;
by a speech feature quantity acquisition section, acquiring audio feature quantity data of a target speech made by the user in response to a vocal statement from a virtual agent; and by an evaluation section, evaluating the feature of the target speech on a basis of a comparison result between the audio feature quantity data of the target speech and the reference feature quantity.

2. The information processing apparatus of claim 1, wherein
the reference feature quantity is defined by a range of numerical values determined on the basis of a plurality of speeches of the user at normal times.

3. The information processing apparatus of claim 2, wherein
the evaluation section uses, as the comparison result, whether the audio feature quantity of the target speech is included in the numerical value range of the reference feature quantity, exceeds an upper limit of the numerical value range, or falls below a lower limit of the numerical value range.

4. The information processing apparatus of claim 1, wherein
the evaluation section evaluates the feature of the target speech by using a predetermined evaluation criterion common to a plurality of users.

5. The information processing apparatus of claim 4, wherein
the evaluation section evaluates the feature of the target speech by using an evaluation criterion targeted for a user group to which the user to be evaluated belongs of a plurality of evaluation criteria targeted for user groups whose speech features exhibit different tendencies.

6. The information processing apparatus of claim 1, wherein
the audio feature quantity of the target speech includes an elapsed time from when an output is made to prompt the user to produce a speech until the user begins to produce the target speech.

7. The information processing apparatus of claim 1, wherein
the audio feature quantity of the target speech includes an audio feature quantity representing a feature during a partial time interval of the target speech.

8. The information processing apparatus of claim 7, wherein
the partial time interval includes at least a time interval at the beginning of speaking during the target speech or a time interval at the end of speaking during the target speech.

9. The information processing apparatus of claim 8, wherein
the audio feature quantity of the target speech includes a differential value between an audio feature quantity during the time interval at the beginning of speaking and an audio feature quantity during the time interval at the end of speaking.

10. The information processing apparatus of claim 1, wherein
the evaluation section calculates, for each of a plurality of kinds of emotions, an index value representing the possibility of the emotion being included in the target speech as a feature of the target speech,
the information processing apparatus further comprising:
an output section adapted to make an output appropriate to the calculated index value.

11. The information processing apparatus of claim 10, wherein
the output section causes a display apparatus to display a magnitude of an index value calculated for each of the plurality of kinds of emotions in such a manner that correlated emotions are adjacent to each other.

12. The information processing apparatus of claim 1, wherein determination of the reference feature quantity is performed by the reference feature quantity determination section at regular intervals.

13. The information processing apparatus of claim 1, wherein the reference feature quantity is determined only if the speech of the user during the normal times does not indicate any strong emotion.

14. An information processing method, comprising:
by a reference feature quantity determination section, determining a reference feature quantity representing a feature of a user's speech at normal times from a plurality of reference speeches,
wherein a first reference speech of the plurality of reference speeches is acquired immediately after a first interaction with the user in response to a greeting displayed to the user;
by a speech feature quantity acquisition section, acquiring audio feature quantity data of a target speech made by the user in response to a vocal statement from a virtual agent; and
by an evaluation section, evaluating the feature of the target speech on a basis of a comparison result between the audio feature quantity data of the target speech and the reference feature quantity.

15. A non-transitory computer-readable information storage medium storing a program for a computer, the program including
by a reference feature quantity determination section, determining a reference feature quantity representing a feature of a user's speech at normal times from a plurality of reference speeches,
wherein a first reference speech of the plurality of reference speeches is acquired immediately after a first interaction with the user in response to a greeting displayed to the user;
by a speech feature quantity acquisition section, acquiring audio feature quantity data of a target speech made by the user in response to a vocal statement from a virtual agent; and
by an evaluation section, evaluating the feature of the target speech on a basis of a comparison result between the audio feature quantity data of the target speech and the reference feature quantity.

* * * * *